March 26, 1940. H. N. EKLUND 2,195,084
ELEVATOR CONTROL APPARATUS
Filed March 5, 1938   5 Sheets-Sheet 1

INVENTOR
Harry N. Eklund

March 26, 1940. H. N. EKLUND 2,195,084
ELEVATOR CONTROL APPARATUS
Filed March 5, 1938 5 Sheets-Sheet 3

INVENTOR
*Harry N. Eklund*

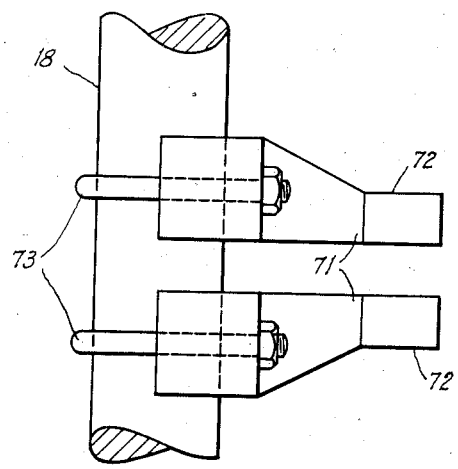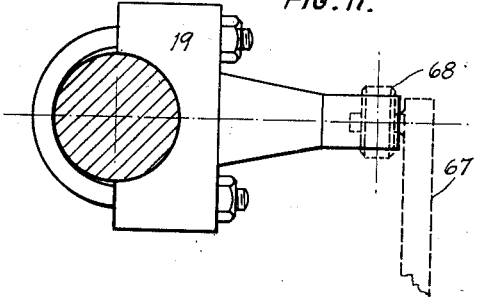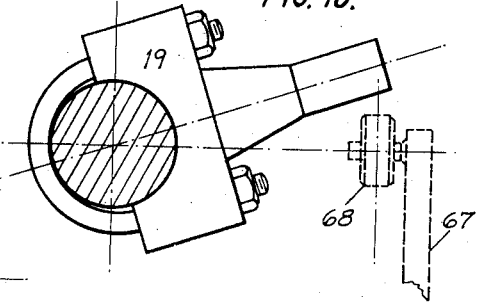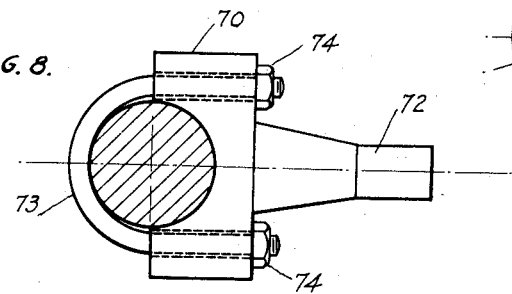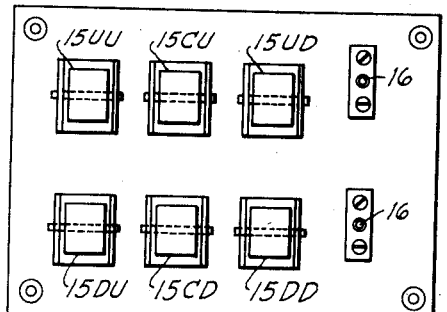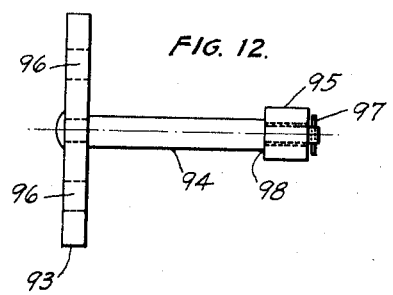

Patented Mar. 26, 1940

2,195,084

UNITED STATES PATENT OFFICE 2,195,084

ELEVATOR CONTROL APPARATUS

Harry N. Eklund, New York, N. Y.

Application March 5, 1938, Serial No. 194,054

3 Claims. (Cl. 187—29)

This invention relates to improvement in controlling apparatus for an elevator system, preferably of the type known as the interceptive push button system, and the basic principles of which are described in detail in United States Patent No. 2,032,475, to which I refer for a correct understanding of the functions required of the various apparatus claimed in this application.

The object of the present invention is to provide floor controller means for carrying out the functions, peculiar to said system, in a novel and less complicated manner.

The objects of the invention reside furthermore in various provisions summarized as follows:—

First, a plurality of switches, designated as direction switches, actuated by members movable in accordance with the movement of the car and serving as directional means for the up and down auxiliary reversing switches.

Second, a stop switch, actuable by a plurality of cams, and causing the stopping of the elevator car at a floor for which a push button, either at that particular floor or in the car, has been actuated.

Third, a plurality of cams, designated as stop cams, mounted on a rotatable member, designated as the cam shaft, and so arranged as to effect the opening of the stop switch when the elevator car is a predetermined distance from the floor for which a push button has been actuated.

Fourth, a mechanism for effecting the movement of the cam shaft.

In the accompanying drawings, I have shown a preferred embodiment of the invention.

Figure 8 is a plan view of a stop cam.

Figure 9 is a side view of a pair of stop cams.

Figure 10 illustrates the relative positions of stop cam and stop roller when the stop cams are retired.

Figure 11 illustrates the relative positions of stop cam and stop roller after the stopping has been initiated.

Figure 12 illustrates a preferred embodiment of the direction switch actuating members.

Figure 13 illustrates the arrangement of the travelling slow-down contacts and the direction switch actuating members.

Figure 1:
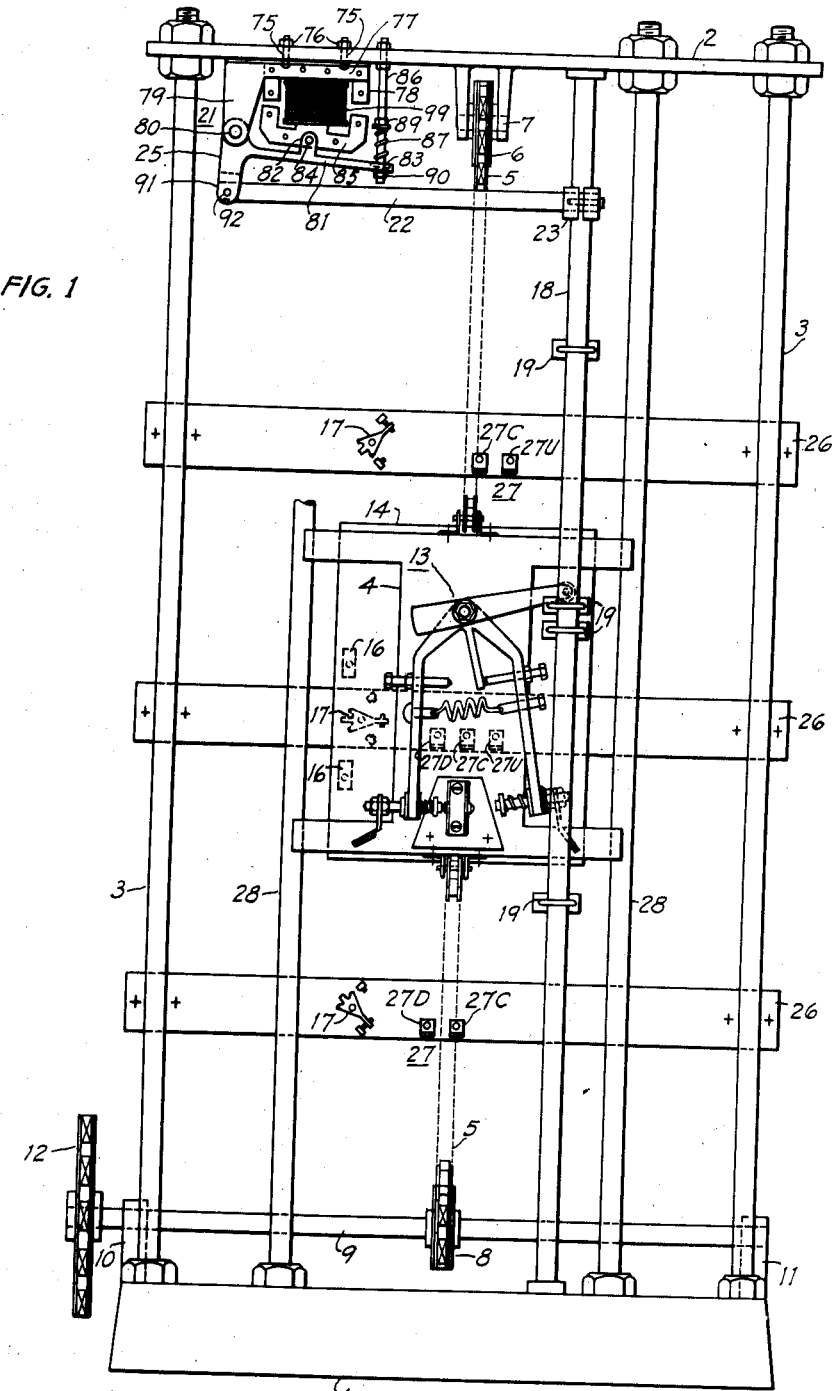
Figure 1 illustrates a side elevation of the complete floor controller with the car at rest at the second floor.
Figure 2:
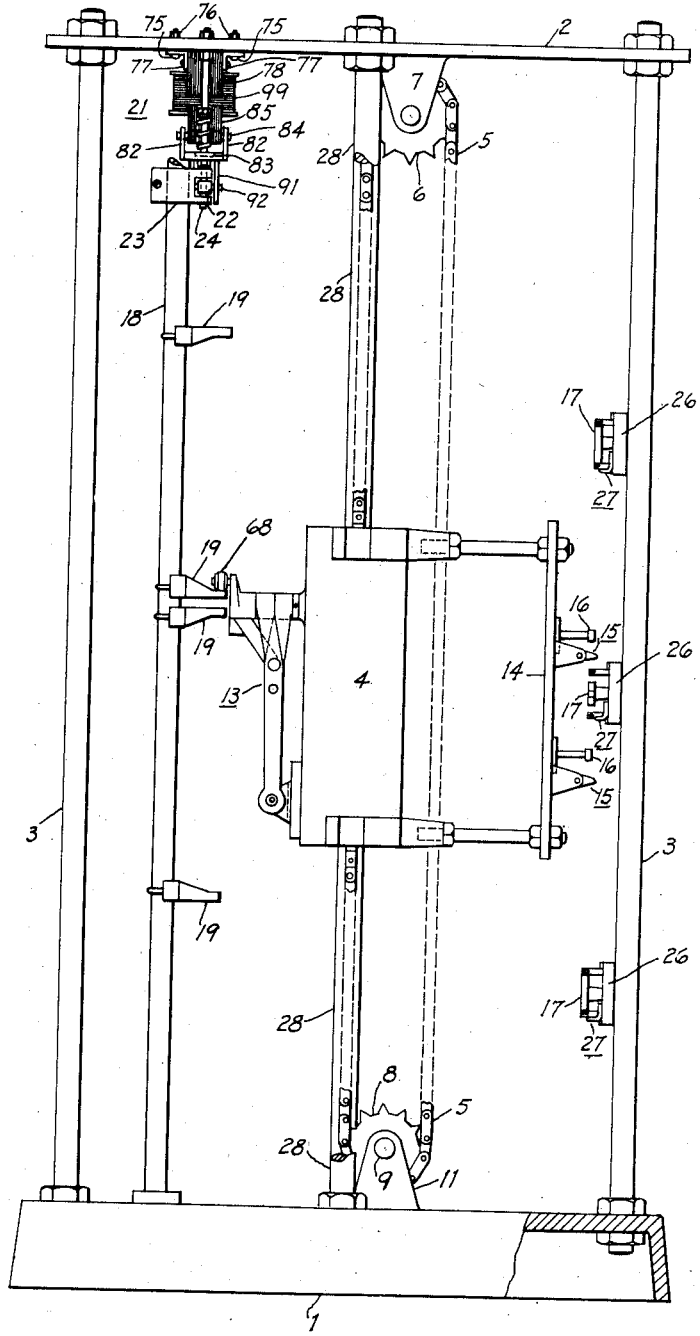
Figure 2 is an elevation at right angles to Figure 1, with certain parts broken away.

Referring now more particularly to Figures 1 and 2, the frame of the floor controller is comprised of a bottom plate 1, a top plate 2, and four standards 3 joined to the top and bottom plates in any well-known manner. The crosshead 4 comprises a member of suitable form, suspended at the end of a chain 5 and suitably guided in the vertical direction as by standards 28. Chain 5 passes over idler sprocket 6, rotatably mounted on shaft 7, down around sprocket 8, keyed to shaft 9 rotatably mounted in the projections 10 and 11 of the bottom plate 1, and up to the crosshead 4, to which it is suitably fastened. The shaft 9 projects outside the frame of the floor controller and keyed to this part of the shaft is a driving sprocket 12, driven in any known way from the elevator car so that the vertical motion of the controller crosshead 4 corresponds, on a reduced scale, to the motion of the elevator car.

Secured to the crosshead 4 are the stop switch 13 and panel 14 of insulating material serving as base for locating the travelling slow-down contacts, designated as a whole by numeral 15, and the actuating members 16 for operating the direction switches 17.

The cam shaft 18, the ends of which are rotatably mounted in the bottom plate 1 and top plate 2, respectively, carries the stop cams 19, of which there are two for each floor so arranged that when certain conditions prevail, the upper one actuates the stop switch when the elevator car is moving downwardly and the lower one when the elevator car is moving upwardly.

The cam shaft 18 is, in order to effect rotational movement thereof, positively coupled to an electromagnet 21, designated as stop magnet, by means of rod 22, clamp 23, pin 24 and magnet arm 25.

The floor bars 26 of insulating material, spaced to correspond to the actual floors and suitably fastened to standards 3, serve as bases for locating the stationary slow-down contacts, designated as a whole by numeral 27, and the direction switches 17.

Having generally described the apparatus as shown in Figures 1 and 2, I shall now explain the parts in detail.

Figure 3:
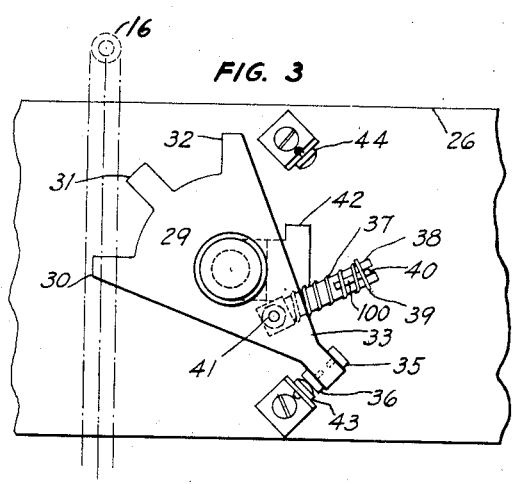
Figure 3 is a plan view of the direction switch.
Figure 4:
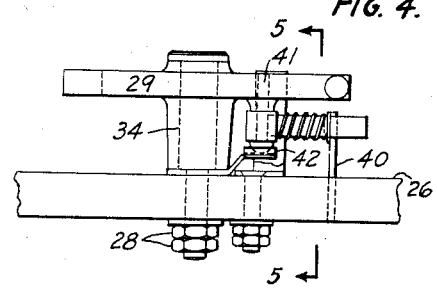
Figure 4 is a side view of the direction switch.
Figure 5:
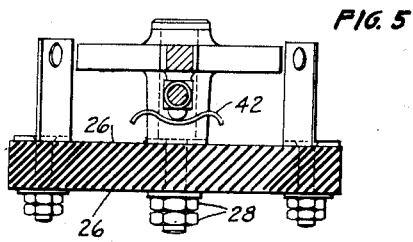
Figure 5 is a vertical section taken along line 5—5 of Figure 4, with the switch in its neutral position.

The direction switch 17, as illustrated in Figures 3, 4 and 5, comprises a plane switch structure 29 provided with three cog-like coplanar projections 30, 31, 32, and a contact projection 33. The switch structure is pivotally mounted on axle 34, which at the same time serves as means for securing it to the floor bar 26. It further comprises two contacts 35 and 36 and a compression spring 37 guided on a cylindrical member 38, one end of which is rotatable about the pin 41 while the other end is restrained by pin 40 passing through a longitudinal slot 100. The outer end of spring 37 is held by a washer 39 abutting against pin 40 fixed to floor bar 26. A spring member 42, held in position by a shoulder on axle 34, coacts with the head of pin 41 to hold the switch in a substantially central position between fixed contacts 43 and 44. Spring 37 is so dimensioned as to give the proper contact pressure when the switch is in either of its two extreme positions. Two nuts 28 serve as means for securing the axle 34 to the floor bar, as well as for attaching the current lead, the current passing through axle 34 directly to switch member 29. To clarify the operation of the direction switch, it will be assumed that the elevator car is approaching the floor corresponding to the switch from above, in which case the switch will be in the extreme position shown in Figure 3. The actuating members 16 are set to move in such a vertical line as to engage projections 30, 31 and 32 of the switch and are, furthermore, placed so that the distance between them corresponds approximately to twice the stopping distance of the elevator. Consequently, as the elevator car reaches the point, where, through the medium of the slowdown contacts 15, the slowing down of the car is initiated, the lower actuating member will engage projection 30 of the direction switch and, continuing the motion, shift the switch into the central position before disengaging it. When the elevator has been brought to a stop, the direction switch will be in the central position with projection 31 horizontal and one actuating member on each side of the projection. If it be assumed that the elevator is passing a floor for which no button has been actuated, it is perceived that after the first actuating member has shifted the switch into a central position between contacts 43 and 44, the second actuating member will in its turn engage projection 31 to shift the switch into such a position as to bring contacts 35 and 44 into engagement. It is, from the aforesaid, clear that all direction switches above the floor bar corresponding to the floor at which the elevator car is standing are in such a position that projection 32 is horizontal and contacts 35 and 44 are in engagement, and that all direction switches below that floor bar are in such a position that projection 30 is horizontal and contacts 36 and 43 are in engagement. Furthermore, it is clear that the direction switch for the floor, at which the elevator car is standing, is in such a position that projection 31 is horizontal and that the switch arm 33 is in its central position between contacts 43 and 44. Contacts 35 and 36 of each direction switch are electrically connected with the corresponding floor relay contacts, and since contacts 44 of all the direction switches are connected in series with one another and with the auxiliary up reversing switch and contacts 43 of all the direction switches are connected in series with one another and with the auxiliary down reversing switch, it is from the foregoing clear that they serve as directional means for said auxiliary up and down reversing switches.

The stop cams, as illustrated in Figures 8 and 9, comprise a member 70, having on one side a projecting lug 71, while on the opposite side a semicircular hollow is provided enabling the cams to be readily attached to the cam shaft 18 by means of a U-shaped clamp 73 and nuts 74. I provide two cams for each floor, except for the terminal, where I provide only one at each, and prefer to so place them that the plane sides of the cams are turned to one another, while the faces 72 of the cams are turned away from one another. I furthermore locate the cams for the various floors so as to all point in the same direction, i. e. all the cams are in the same vertical plane.

Referring back to Figure 1, the stationary core 78 of the stop magnet 21 is secured to the underside of the top plate 2 as by bolts 75 and nuts 76. The side plates 77 of the stationary core 78 are provided with extensions 79 which coact to form bearing supports for pin 80 serving as axle for magnet arm 25. Magnet arm 25, which rocks around pin 80, comprises a horizontal bracket 81 with two lugs 82 and at the end an aperture 83. Apertures formed in lugs 82 serve for locating pin 84, which, passing through a similar aperture in the movable magnet core 85, permits, for the purpose of proper alinement, core 85 to rock a slight amount around it. A threaded bolt 86, secured to the top plate 2, extends downward and passes through the aperture 83 in the bracket 81. A spring 87, compressed on the bolt 86 between an adjustable nut 89 and a depression formed in bracket 81 around the aperture 83, assists the weight of the movable magnet core 85 to separate the cores when the magnet coil 99 is deenergized. An adjustable stop nut 90 serves to regulate the maximum opening of the magnet. The forked end of extension 91 of the magnet arm 25 acts as bearing support for pin 92 serving as axle for one end of connecting rod 22 between magnet arm 25 and cam shaft 18. The other end of connecting rod 22 connects to cam shaft 18 by means of clamp 23, secured to cam shaft 18, and pin 24.

Figure 6:
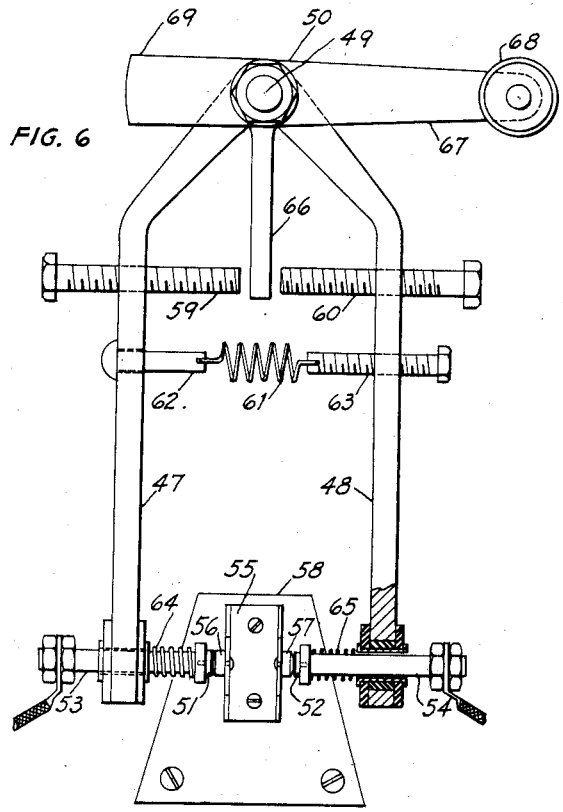
Figure 6 is a front view of the stop switch.
Figure 7:
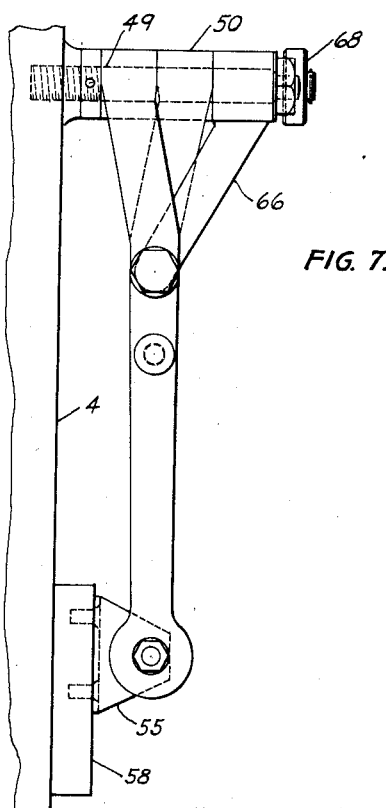
Figure 7 is a side view of the stop switch.

The stop switch as illustrated in Figures 6 and 7 comprises two separate switch arms 47 and 48 pivotally mounted on a common axle 49 rigidly secured in the crosshead 4, and a switch operating member 50 also rotatable about axle 49. The ends of the switch arms 47 and 48 are provided with insulating apertures serving as guides for contact stems 53 and 54, carrying contacts 51 and 52. The switch operating member 50 has a lug 66 centrally disposed between switch arms 47 and 48 so that, when rotated about the axle 49, it will strike against abutment screws 59 and 60. An arm 67 extends at a right angle to lug 66 and supports at its outer end a stop roller 68. Projection 69 serves as counterbalance for roller arm 67 and stop roller 68. A U-shaped plate 55, secured to insulating board 58 serves as holder for contacts 56 and 57. Tension spring 61, attached at one end to swivel pin 62 and at its other end to adjustment screw 63, coacts with the switch arms to give the proper pressure between contacts 51 and 56 and between contacts 52 and 57. Two springs 64 and 65 arranged on contact stems 53 and 54, respectively, act to cushion the impact when the switch closes.

Reference may now be had to Figure 11 which shows the relative positions of the stop cam for a particular floor and the stop roller 68 of the stop switch when the car is at rest at that floor. With the stop cams in this position, the magnet coil 99 of the stop magnet 21 is deenergized and the magnet cores separated so that the outer end of bracket 81 is resting on adjustment nut 90. If it be assumed that the elevator car approached the floor, at which it is standing, from above, the stop roller 68 will be resting on face 72 of the upper stop cam for that particular floor while lug 66 abutting against adjustment screw 60 maintains the contacts 52 and 57 of the stop switch separated. Had the elevator approached the floor from below, the stop cam for that floor and lug 66 abutting against adjustment screw 59 would have maintained the contacts 51 and 56 separated. Since contacts 52 and 57, as well as contacts 51 and 56, are in series connection with the up and down main reversing switches, the separation of either pair of contacts causes the stopping of the elevator car.

In order to restart the car, contacts 52 and 57 of the stop switch must reengage to complete the circuit for the main reversing switches. This is accomplished through the energization of magnet coil 99 of the stop magnet 21. Referring back to Figures 1 and 2, the energization of stop magnet 21 causes the movable magnet core 85 to be pulled up so as to abut against the stationary magnet core 78. Since the movable magnet core 85 is connected to bracket 81, the magnet arm 25 will describe an angular movement around pin 80, causing, because of the relatively small angle involved, a substantially longitudinal movement of connecting rod 22. The longitudinal movement of the connecting rod 22 is, by means of bearing pin 24 and clamp 23, imparted to the cam shaft 18 as an angular movement so proportioned as to bias the stop cams into a plane where they do not interfere with the motion of the stop roller 68. As a result of the retirement of the stop cams, the stop roller 68 rolls off the face 72 of the stop cam, against which it was resting, and permits the contacts 52 and 57 of the stop switch to reengage, thus enabling the restarting of the elevator car. Figure 10 shows the relative positions of stop cams and stop roller after the retirement of the cams has been effected.

The actuating members 16, as illustrated in Figure 12, comprise a rectangular base plate 93 to which is secured a stem 94, turned down at the outer end to accommodate roller 95 between shoulder 98 and pin 97. Two holes 96 serve for securing the actuating members to the insulating panel 14 as by bolts.

Travelling slow-down contacts 15 and stationary contacts 27 may be of any design well known to the art and do, consequently, not require any detailed description, but, in order to clarify the operation of the floor controller, reference may be had to Figure 13 showing the arrangement of the travelling slow-down contacts 15 and the actuating members 16. For the purpose of distinguishing the individual travelling slow-down contacts from one another, I have combined the numeral 15, designating them as a whole, with identifying letters. Thus, contacts 15UU and 15CU effect the slow-down of the elevator when the latter is moving upwardly in response to the actuation of an "up" hall button or a car button for a farther-up floor, respectively, while contacts 15DD and 15CD effect the slow-down of the elevator car when the latter is moving downwardly in response to the actuation of a "down" hall button or a car button for a farther-down floor, respectively. Contact 15DU effects the slow-down of the elevator car when the latter is moving downwardly in response to the actuation of an "up" hall button, while contact 15UD effects the slow-down when the car moves upwardly in response to the actuation of a "down" hall button.

The stationary slow-down contacts 27 may, for identifying purposes, also be individually designated by a combination of numeral 27, designating them as a whole, and a letter. In the following, the stationary slow-down contacts, which at the slow-down points engage the travelling slow-down contacts 15UU or 15DU, will be designated by the combination 27U, those which engage the travelling slow-down contacts 15CU or 15CD will be designated by the combination 27C, while those engaging the travelling slow-down contacts 15UD or 15DD will be designated by the combination 27D.

The principles of operation of a push button system of the interceptive type are so well known to those skilled in the art that a detailed description thereof, based on a diagrammatic representation of the control and power circuits necessary, is superfluous. However, in order to eliminate any misunderstanding as to the functions of the various parts claimed in this application, I have shown in Figure 14 the essential circuits, switches and relays used in conjunction with the parts described, and I shall now describe how these parts coact to control the starting and stopping functions of the elevator car in a two-speed, alternating current installation of the interceptive push button type.

Figure 14:
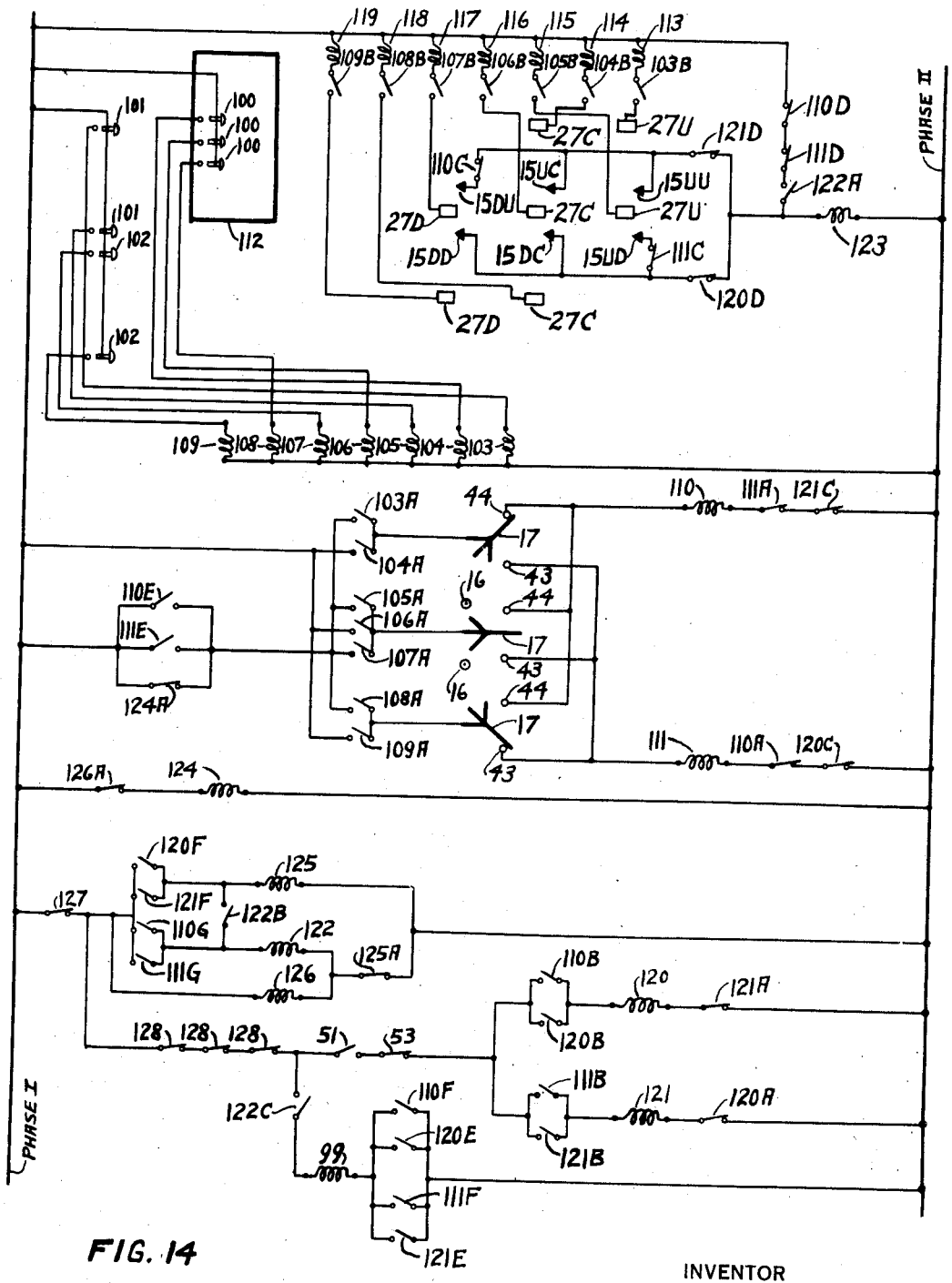
Figure 14 illustrates a portion of the control diagram.

Referring now more particularly to Figure 14 it comprises an elevator car 112; a set of car buttons 100, one for each landing; "up" and "down" hall buttons 101 and 102 respectively for each intermediate landing and one push button for each terminal landing; a set of floor relays of the latching type having two magnetizing coils, one for closing and one for re-setting the relay. The closing coils of the floor relays, which are in series with their respective push buttons, are numbered consecutively from 103 to 109 inclusive while the corresponding re-set coils, which are connected to the stationary slow down contacts are numbered consecutively from 113 to 119 inclusive. Each relay has two pairs of contacts, which for the purpose of identification are designated by the numeral of the corresponding relay coil and a letter. For example, contacts designated 106A and 106B are operated by relay coil 106.

Other elements included in the diagram are: A "start-and-stop" relay of the latching type having a closing coil 122, a reset coil 123 and making contacts 122A, 122B and 122C; auxiliary up reversing switch 110 with making contacts 110B, 110E, 110F, 110G and breaking contacts 110A, 110C, 110D; auxiliary down reversing switch 111 with making contacts 111B, 111E, 111F, 111G, and breaking contacts 111A, 111C, 111D; main up reversing switch 120 with making contacts 120B, 120E, 120F, and breaking contacts 120A, 120C, 120D; main down reversing switch 121 with making contacts 121B, 121E, 121F, and breaking contacts 121A, 121C, 121D.

It further comprises: Hall time relay 124 with breaking contact 124A; gate time relay 125 with breaking contacts 125A; auxiliary time relay 126 with breaking contact 126A; stop magnet coil 99; stop switch contact pairs 51, 56 and 52, 57; gate contact 127 and door contacts 128.

Making contacts, i. e. contacts, which close when the associated magnet coil is magnetized, are shown separated, while breaking contacts, i. e. contacts, which separate when the associated magnet coil is demagnetized, are shown closed.

The driving motor and its control circuits are not shown since the acceleration and deceleration may be carried out according to any well known method without effecting the circuits shown.

Let it be assumed that a prospective passenger actuates a push button at a floor above the one at which the elevator is standing and, furthermore, let the button actuated be an "up" button. The actuation of the button effects the energization of "up" floor relay switch winding for the floor corresponding thereto. Each floor relay is provided with two pairs of contacts. One pair of contacts lies in the "up" intercepting circuit for that floor and causes, upon closing, the stationary slow-down contact 27U for that floor to become "alive" with respect to the travelling slow-down contact 15UU. The other pair of contacts completes a circuit through contacts 35 and 44 of the direction switch 17 for that floor and through the auxiliary up reversing switch 110. The latter thereupon becomes energized and completes through its several contacts a number of circuits, including one for the closing coil 122 of the "start-and-stop" relay, which in its turn completes a circuit for coil 99 of stop magnet 21, and establishes circuits necessary to the acceleration of the driving motor. The energization of stop magnet 21 effects the withdrawal of the stop cams, as previously described, thus permitting the reengagement of stop contacts 51 and 56 or 52 and 57, whichever pair may be open. The reengagement of the stop contacts completes the circuit for the up main reversing switch 120 which becomes energized and upon closure of its main and several auxiliary contacts effects the starting and accelerating of the elevator car in known manner.

The car is now moving upwardly, accelerating up to its fast speed rate, and will continue at this speed rate until it reaches the "up" slow-down point, i. e. until the selector crosshead 4 reaches the point where travelling "up" slow-down contact 15UU engages the stationary slow-down contact 27U. The latter being "alive", a current passes through the reset coil 123 of the "start-and-stop" relay, which is part of this circuit. This relay becomes, as a result hereof, "reset", and its several contacts 122A, 122B, 122C separate to effect the opening of a number of circuits. One of these circuits includes the stop magnet coil 99, which, upon becoming deenergized, separates its cores and effects with the assistance of spring 87 the rotary movement of cam shaft 18, necessary to move stop cams 19 into the line of the stop roller 68. Another circuit (not shown) opened by the resetting of the relay effects, through intermediary electromagnetic switches (not shown), the slow-down of the car, bringing it down to its slow speed rate. Simultaneously with, or shortly before, the engagement of the travelling and stationary slow-down contacts, the upper actuating member 16 engages the horizontal projection 32 of the direction switch 17 for that floor and subsequently rotates the switch member to effect the separation of contacts 35 and 44. If no additional "up" button has been actuated at a floor above, or in the car for such a floor, the auxiliary up reversing switch 110 will become deenergized when contacts 35 and 44 are separated. This has, however, no effect in the case now being considered, but will be referred to later The elevator car, after reaching its slow-down speed rate, is permitted to travel a comparatively short distance at this speed rate in order to obtain stable low speed under all conditions of loading before the final stopping takes place. The final stopping is effected when stop roller 68, resting against the face 72 of the lower stop cam 19, has taken up all the lost motion between lug 66 of the stop switch operating member 50 and adjustment screw 59 as well as between the contact stem 53 and stop switch arm 47, so that further upward travel of the crosshead 4 causes the separation of stop contacts 51 and 56. Since these contacts are in series with the coils of the reversing switches, the immediate result is the deenergization of the up reversing switch, and consequent stopping of the car.

It will now be assumed that another button is actuated at a floor above the one considered prior to the car passing the up slow-down point. In such case, the up reversing switch will not become deenergized when contacts 35 and 44 of the direction switch are separated as an additional circuit for the up reversing switch is established through the contacts of the up floor delay switch and contacts 25 and 44 of the direction switch for the floor above. Consequently, the auxiliary up reversing switch does not open its contacts and the elevator car, the stopping of which is effected in the same manner as previously described, will retain its previous direction of travel when restarted, irrespective of whether in the meantime any down buttons have been actuated at floors below. This is, as known, the distinguishing feature of the interceptive automatic push button system.

Having described the operation of the floor controller when the car, moving upwardly, stops in response to the actuation of an "up" button, it is believed that the operation of the floor controller when the car, moving downwardly, stops in response to the actuation of a "down" button, will be fully understood without any further description.

It will now be assumed that a "down" button has been actuated at some floor above that at which the car is at rest. The car will start in the upward direction in exactly the same manner as previously explained, but this time the "down" floor relay switch winding for the floor in question is energized and the corresponding stationary slow-down contact 27D is made "alive". Initiation of the slow-down requires in this case that the circuit through the reset coil of the stop relay be completed by the engagement between travelling slow-down contact 15UD and stationary slow-down contact 27D. Travelling slow-down contacts 15UD and 15DU are during the operation of the elevator car normally disconnected from the intercepting circuits in order to prevent reversal of the car before it completes its travel in response to the farthest actuated button. If it is assumed that in the present case the "down" button actuated is at a farthest-up floor, travelling slow-down contact 15UD must be connected to the intercepting circuit in order to effect the slow-down. This is accomplished by the opening of the auxiliary up reversing switch, the back contacts 106C of which engage to connect the slow-down contact 15UD to the interceptive circuit. The opening of the auxiliary up reversing switch is, as previously described, effected by the separation of contacts 35 and 44 of the direction switch 17 for that floor, and, as this takes place simultaneously with or shortly before the slow-down point is reached, the subsequent engagement of travelling slow-down contact 15UD and stationary slow-down contact 27D establishes the energizing circuit for stop relay "reset" coil where-upon the slow-down and stopping of the elevator car takes place as previously described.

Having described how the apparatus functions to slow down and stop the elevator car when it is moving upwardly in response to the actuation of a "down" button, it is believed that the operation of the apparatus when the car is moving downwardly in response to the actuation of an "up" button will be fully understood without any further explanation.

While I have described the invention as applied to a two-speed alternating current system, it will be appreciated that my invention may be adapted equally well to a single-speed alternating current system, as well as to single or multi-speed direct current systems. Furthermore, while I have described this invention as applied to an automatic push button system of the interceptive type, it will be obvious that my invention may also be adapted to various kinds of elevator control, including single automatic push button and car switch with automatic stopping.

While in the drawings the invention has been shown as applied to a three-floor elevator system, it will be obvious that any number of floors may be employed.

While I have shown and described certain specific embodiments of my invention, I am aware that many changes, deviations and modifications may be made without departing from the spirit and scope thereof, as indicated in the appended claims.

I claim:

1. Controlling apparatus for an elevator system comprising an elevator car serving a plurality of floors, a crosshead movable in accordance with the movement of the car, an up stop cam and a down stop cam for each of said floors, said stop cams having an operative and an inoperative position, a stop switch carried by said crosshead, said stop switch comprising an up stop switch arm, a down stop switch arm, means for biasing said switch arms to switch closed position, and a switch operating member having an extended arm supporting a stop roller, said stop roller being adapted, when said stop cams are in their operative position, to successively engage said up stop cams during up car travel and said down stop cams during down car travel, said stop roller, upon continued movement of said crosshead after the engagement of the roller with the stop cam, causing movement of said operating member to cause the operation of said up stop switch arm to stop the car in up car travel and of said down switch arm to stop the car in down car travel, and means for biasing said stop cams from their inoperative to their operative position and vice versa.

2. Controlling apparatus for an elevator system comprising an elevator car serving a plurality of floors, a crosshead movable in accordance with the movement of the car, a stop switch comprising an up stop switch arm, a down stop switch arm, an up stop abutment on said up stop switch arm, a down stop abutment on said down stop switch arm, a pivoted switch operating member having a lug disposed between said abutments effective, when moved into engagement with said abutments, to cause the operation of said stop switch arms to stop the car, said abutments being separately adjustable to cause said lug, before engaging said abutments to execute a larger or smaller movement, a single adjustment of said up stop abutment causing at all floors an equal displacement of the up stop point proportionate to such an adjustment and a single adjustment of said down stop abutment causing at all floors an equal displacement of the down stop point proportionate to such an adjustment, means at a plurality of floors for effecting movement of said switch operating member, and means for biasing said stop switch arms to switch closed position.

3. Controlling apparatus for an elevator system comprising an elevator car serving a plurality of floors, a crosshead movable in accordance with the movement of the car, a stop switch carried by said crosshead, said stop switch having an up stop switch arm and a down stop switch arm, a switch operating member having an extended arm supporting a stop roller for causing movement of said operating member to effect the operation of said stop switch arms, a pair of stop cams for each floor, said stop cams having an inoperative and an operative position, a single cam shaft to support said stop cams, each pair of said stop cams comprising an up stop cam adapted, when in its operative position, to arrest the motion of said stop roller during up car travel to cause movement of said operating member to operate said up stop switch arm to stop the car, and a down stop cam adapted, when in its operative position, to arrest the motion of said stop roller during down car travel to cause movement of said operating member to operate said down stop switch arm to stop the car, means for biasing said stop cam shaft to bring said stop cams into their operative position, and an electromagnet for causing movement of said stop cam shaft to bring said stop cams into their inoperative position against the force of said biasing means.

HARRY N. EKLUND.